United States Patent
Yamanaka

(10) Patent No.: US 8,451,487 B2
(45) Date of Patent: May 28, 2013

(54) IMAGE FORMING APPARATUS

(75) Inventor: Shuichi Yamanaka, Tokyo (JP)

(73) Assignee: Oki Data Corporation, Tokyo (JP)

( * ) Notice: Subject to any disclaimer, the term of this patent is extended or adjusted under 35 U.S.C. 154(b) by 981 days.

(21) Appl. No.: 12/468,999

(22) Filed: May 20, 2009

(65) Prior Publication Data

US 2009/0323120 A1     Dec. 31, 2009

(30) Foreign Application Priority Data

Jun. 30, 2008   (JP) .................... 2008-170957

(51) Int. Cl.
*G06K 15/00*   (2006.01)

(52) U.S. Cl.
USPC ............... 358/1.16; 358/1.1; 358/1.9

(58) Field of Classification Search
USPC ................. 358/1.1, 1.13, 1.14, 1.16
See application file for complete search history.

(56) References Cited

U.S. PATENT DOCUMENTS

| | | | |
|---|---|---|---|
| 7,352,141 B2 * | 4/2008 | Kling et al. ............ | 318/66 |
| 7,894,085 B2 * | 2/2011 | Maeda .................... | 358/1.13 |
| 2003/0145166 A1 * | 7/2003 | Miwa et al. ............ | 711/114 |

FOREIGN PATENT DOCUMENTS

| | | |
|---|---|---|
| JP | 2006-201262 A | 8/2006 |
| JP | 2006-221381 A | 8/2006 |
| JP | 2007-296723 A | 11/2007 |

* cited by examiner

*Primary Examiner* — King Poon
*Assistant Examiner* — Iriana Cruz
(74) *Attorney, Agent, or Firm* — Marvin A. Motsenbocker; Mots Law, PLLC

(57) ABSTRACT

A reception controller receives print data. A volatile memory stores program information for performing image formation. An image forming unit forms an image based on the print data. An image formation controller receives the program information and controlling the image forming unit. A power supply stops supply of power to the volatile memory, image forming controller and image formation unit during supply power to the reception controller when a normal mode is switched to a power saving mode. An auxiliary volatile memory is supplied with power. An information saving path is for saving information in the volatile memory to the auxiliary volatile memory. In response to a detection of the switching from the power saving mode to the normal mode, the reception controller instructs the power supply to supply power to the image formation controller, volatile memory and image forming unit, and transfers the program information in the auxiliary volatile memory to the volatile memory.

12 Claims, 7 Drawing Sheets

IMAGE FORMING APPARATUS

CROSS REFERENCE TO RELATED APPLICATIONS

This application claims priority based on 35 USC 119 from prior Japanese Patent Application No. P2008-170957 filed on Jun. 30, 2008, entitled "Image Forming Apparatus", the entire contents of which are incorporated herein by reference.

BACKGROUND OF THE INVENTION

1. Field of the Invention

The invention relates to an image forming apparatus including a controller configured to control switching to a power saving mode and switching back from the power saving mode.

2. Description of Related Art

An image forming apparatus, or an image forming system, according to the related art includes: a controller configured to convert print data acquired from a host apparatus to which the image forming apparatus is connected through a network, into image data whose image is printable by a print mechanism (engine); and the printer engine is configured to perform a printing process based on the converted image data. The controller includes a central processing unit (CPU), a read only memory (ROM: nonvolatile memory), a random access memory (RAM: volatile memory), a flash memory (nonvolatile memory), a power supply, a circuit configured to detect jobs, and the like. The controller performs various processes by using various programs and data, the programs and data previously being copied from the ROM providing slow access, to the RAM providing fast access, when the apparatus is powered on.

When a job waiting state continues longer than a predetermined time, the various programs and data held by the RAM are copied to the flash memory which provides fast access. After the copying of the programs and data to the flash memory is completed, the power supply continues supplying power only to the circuit configured to detect jobs, while cutting off power to the other units included in the controller, such as the CPU, the ROM, the RAM and the flash memory. Thus, the image forming system is switched to a sleep mode (power saving mode).

Then, in the image forming system, when the circuit detects a job during the power saving mode, the power supply resumes supplying power to the entire controller under the control of the circuit and the CPU starts to operate. Thereafter, upon completion of the copying of the various programs and data held by the flash memory to the RAM, the image forming system is switched back to a normal mode.

SUMMARY OF THE INVENTION

An aspect of the invention provides an image forming apparatus that comprises: a reception controller configured to receive print data; a volatile memory configured to store program information for performing image formation; an image forming unit configured to form an image on the basis of the print data; an image formation controller configured to receive the program information from the volatile memory and to control the image forming unit on the basis of the program information; a power supply configured to stop supply of power to the volatile memory, the image forming controller and the image formation unit while supplying power to the reception controller, when a normal mode is switched to a power saving mode; an auxiliary volatile memory supplied with power by the power supply; and an information saving path configured to save the program information in the volatile memory to the auxiliary volatile memory before the switching to the power saving mode, wherein, when the switching from the power saving mode to the normal mode is detected, the reception controller instructs the power supply to supply power to the image formation controller, the volatile memory and the image forming unit, to thereby transfer the program information in the auxiliary volatile memory to the volatile memory.

The above-described image forming apparatus is capable of switching back to the normal mode in a short time as follows: the program information held in the volatile memory is saved to the auxiliary volatile memory before switching to the power saving mode; and the reception controller transfers the program information in the auxiliary volatile memory to the volatile memory when the power supply starts supplying power to the volatile memory and the image formation controller to switch from the power saving mode to the normal mode, that is, while the image formation controller is performing an initialization operation.

DETAILED DESCRIPTION OF EMBODIMENTS

Figure 1:
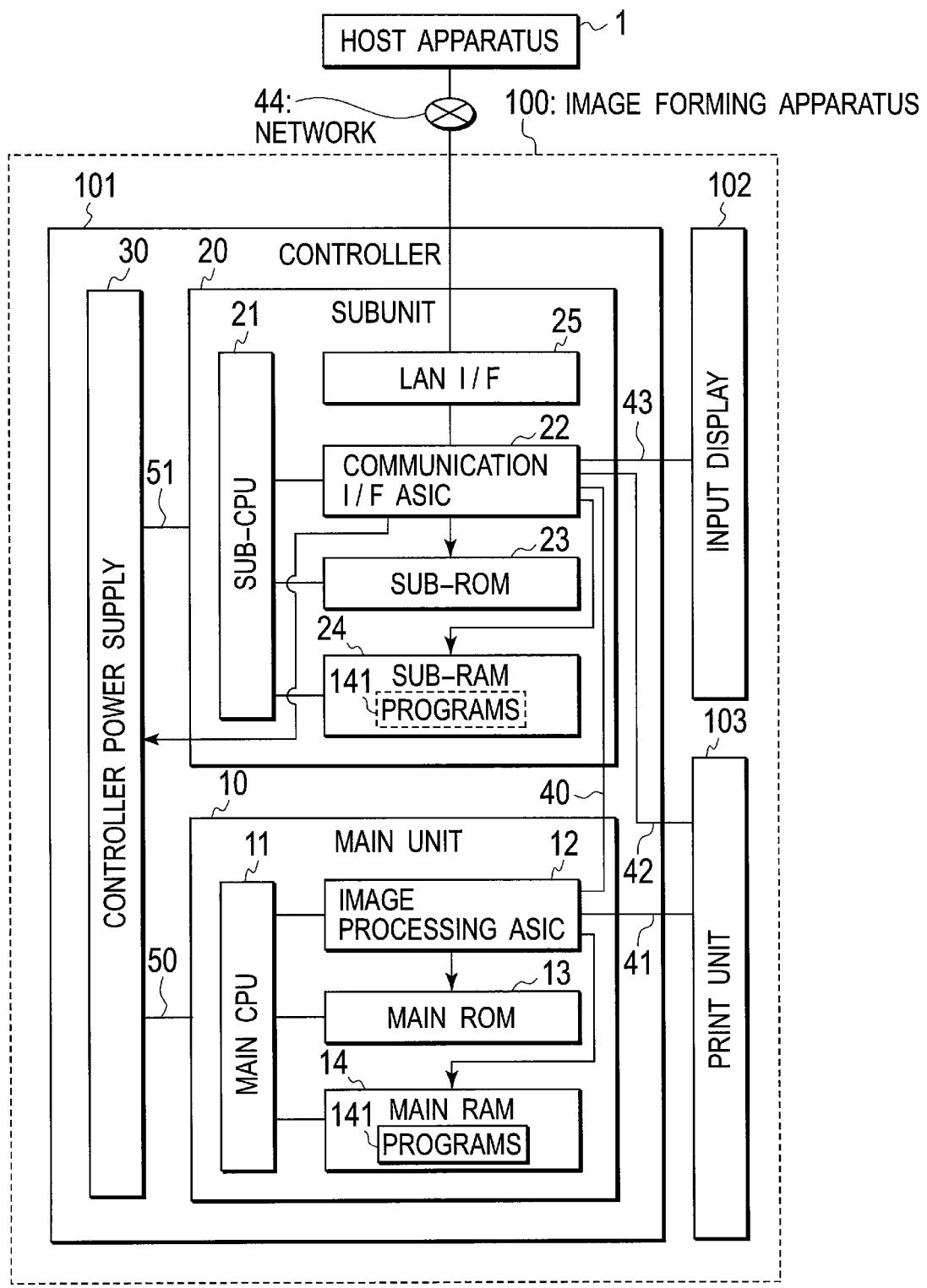
FIG. 1 is a block diagram showing a configuration of an image forming apparatus according to Embodiment 1.

Embodiments are described in detail below with reference to the drawings. In the respective drawings referenced herein, the same constituents are designated by the same reference numerals and duplicate explanation concerning the same constituents is basically omitted. All of the drawings are provided to illustrate the respective examples only. No dimensional proportions in the drawings shall impose a restriction on the embodiments. For this reason, specific dimensions and the like should be interpreted with the following descriptions taken into consideration. In addition, the drawings include parts whose dimensional relationship and ratios are different from one drawing to another.

Configuration of Embodiment 1

As shown in FIG. 1, image forming apparatus 100 of Embodiment 1 is a printer connected to network 44 through LAN interface (I/F) 25 and including controller 101, print unit (image forming unit) 103 and input display 102. Controller 101 is configured to generate image data by converting print data acquired from host apparatus 1 that is connected to network 44, through LAN I/F 25. Print unit 103 is configured to perform print processing based on the generated image data. Input display 102 includes various buttons, a touch panel display and the like. In Embodiment 1, a case in which image forming apparatus 100 is a printer is described as an example. However, image forming apparatus 100 is not limited to this, and may be a multi-function peripheral (MFP) having a printer function.

As shown in FIG. 1, in image forming apparatus 100, controller 101 and print unit 103 are connected through video I/F 41 and CPU command I/F 42. Moreover, in image forming apparatus 100, controller 101 and input display 102 are connected through panel I/F 43. Subunit 20 of controller 101 includes an unillustrated hard disc drive (HDD) I/F, which allows a configuration in which image forming apparatus 100 can be provided with an add-on HDD unit as an option.

As shown in FIG. 1, controller 101 includes: main unit 10 configured to control the entire apparatus; subunit 20 configured to perform data communication with external apparatus; and controller power supply 30. Main unit 10 is connected to controller power supply unit 30 through power supply line 50 as shown in FIG. 1. Subunit 20 is connected to controller power supply 30 through power supply line 51 as shown in FIG. 1.

Main unit 10 functions as an image formation controller, and includes, as shown in FIG. 1, main CPU 11, image processing application specific integrated circuit (ASIC) 12, main ROM 13 and main RAM 14. Main CPU 11 functions as an information saving unit.

Main ROM 13 is a nonvolatile memory for storing various programs to be executed by main CPU 11 and various data such as user set values. The various programs include, for example: an image data processing program for generating, through rasterization, bit-mapped image data by converting vector print data to be used by image processing ASIC 12; and an initialization program loaded when power is supplied or when the power saving mode is switched back to the normal mode.

Main RAM 14 is a volatile memory, which provides faster access than main ROM 13. Main RAM 14 stores therein various programs 141 copied from main ROM 13 in order that main CPU 11 can perform high-speed processing, and receives, from main CPU 11, an instruction to load various copied programs 141. Main RAM 14 can hold various programs 141 until power supply from controller power supply 30 is cut off.

Subunit 20 functions as a reception controller, and includes, as shown in FIG. 1, sub-CPU 21, communication I/F ASIC 22, sub-ROM 23, sub-RAM 24 and LAN I/F 25.

Sub-ROM 23 is a nonvolatile memory for storing various programs to be executed by sub-CPU 21 and various data such as user set values. The various programs include, for example: a communication processing program to be used by communication I/F ASIC 22; a reception data judgment program for analyzing the type of reception data acquired through communication processing; a control command processing program to be used when the reception data is a control command; and an initialization program to be loaded when power is supplied or when the power saving mode is switched to the normal mode.

Sub-RAM 24 is a volatile memory, which provides faster access than sub-ROM 23. Sub-RAM 24 stores therein various programs copied from sub-ROM 23 in order that sub-CPU 21 can perform high-speed processing, and receives, from sub-CPU 21, an instruction to load the copied various programs.

Sub-RAM 24 stores therein, for example, print data that is received by communication I/F ASIC 22 from host apparatus 1, such as a personal computer (PC), connected to network 44, through LAN interface 25. Sub-RAM 24 can hold the various programs until power supply from controller power supply 30 is cut off.

As shown in FIG. 1, image processing ASIC 12 of main unit 10 and communication I/F ASIC 22 of subunit 20 are connected through internal bus 40; thereby, data transmission and reception are possible between main unit 10 and subunit 20.

Controller power supply 30 is a DC-DC converter that is supplied with power from an unillustrated power source included in image forming apparatus 100 and that converts the supplied power to rated voltage and thereby supplies the rated voltage to the units included in controller 101. Upon receipt of a power saving mode control signal, to be described later, from communication I/F ASIC 22, controller power supply 30 cuts off power supply to main unit 10 connected through power supply line 50. Moreover, upon receipt of a normal mode control signal, to be described later, from communication I/F ASIC 22, controller power supply 30 resumes supplying power to main unit 10 connected through power supply line 50.

When an unillustrated power supply switch included in image forming apparatus 100 is turned on, the unillustrated power source included in image forming apparatus 100 supplies power to controller power supply 30. When supplied with the power from the power source, controller power supply 30 supplies the power to all the units included in controller 101, such as main unit 10 and subunit 20. When the power supply switch is turned on, the power source supplies power to print unit 103 and input display 102.

When power supply starts, an unillustrated reset circuit included in main unit 10 generates a reset signal and then transfers the signal to main CPU 11.

Upon receipt of the reset signal, main CPU 11 initializes (resets) an unillustrated register included in main CPU 11 and an unillustrated register included in image processing ASIC 12.

Thereafter, when power supply from controller power supply 30 to main unit 10 becomes stable and when the registers of main CPU 11 and image processing ASIC 12 are initialized and the reset signal consequently becomes void (is negated), main CPU 11 starts operating.

Meanwhile, when power supply is started, an unillustrated reset circuit included in subunit 20 generates a reset signal, and then transfers the signal to sub-CPU 21.

Upon receipt of the reset signal, sub-CPU 21 initializes (resets) an unillustrated register included in sub-CPU 21 and an unillustrated register included in communication I/F ASIC 22. In this event, if a HDD unit is connected to an unillustrated HDD I/F included in subunit 20, the HDD unit is also initialized.

Thereafter, when power supply from controller power supply 30 to subunit 20 becomes stable and when the registers of sub-CPU 21 and communication I/F ASIC 22 are initialized and the reset signal consequently becomes void (is negated), sub-CPU 21 starts operating.

In order to execute the initialization program, which is held by main ROM 13 and is to be used for memory initialization processing, main CPU 11 generates, upon startup, an access signal to which a reset vector indicating the starting address of the initialization program is assigned, and then transfers the signal to image processing ASIC 12.

Upon receipt of the access signal, image processing ASIC 12 analyzes the address indicated by the reset vector assigned to the signal (address decoding), reads corresponding instruction data from main ROM 13 on the basis of the address, and then transfers the read instruction data to main CPU 11.

Main CPU 11 repeatedly reads instruction data and executes the initialization program, every time receiving instruction data from image processing ASIC 12. In order to copy the various programs stored in main ROM 13, to main RAM 14, main CPU 11 initializes main RAM 14 and then performs a write test on main RAM 14 to check whether main RAM 14 is operating with no problem.

When confirming that main RAM 14 operates normally, main CPU 11 copies the various programs, such as the image data processing program, and the various data stored in main ROM 13, to main RAM 14, which provides faster read access, through image processing ASIC 12. Thereby, in the subsequent processes, main CPU 11 reads and then executes various programs 141 held by main RAM 14, which provides faster access, and is thus capable of high-speed processing. Here, if the capacity of main RAM 14 is insufficient, various programs 141 may not necessarily be copied from main ROM 13 to main RAM 14. In this case, various programs 141 can be read from main ROM 13, instead of main RAM 14, and then executed, although the processing speed is slower.

When starting operating, sub-CPU 21 repeatedly reads the instruction data from sub-ROM 23 storing therein the initialization program, through communication I/F ASIC 22, and then executes the initialization program. In this event, sub-CPU 21 initializes sub-RAM 24 and then performs a write test on sub-RAM 24 to check whether sub-RAM 24 operates with no problem.

When confirming that sub-RAM 24 operates normally, sub-CPU 21 copies the various programs stored in sub-ROM 23 to sub-RAM 24, which provides faster read access, through communication I/F ASIC 22. Thereby, in the subsequent processes, sub-CPU 21 reads and then executes the various programs held by sub-RAM 24, which provides faster access, and is thus capable of high-speed processing. Here, if the capacity of sub-RAM 24 is insufficient, the various programs may not necessarily be copied from sub-ROM 23 to sub-RAM 24. In this case, various programs can be read from sub-ROM 23, instead of sub-RAM 24, and then executed, although the processing speed is slower.

When supplied with power, print unit 103 causes motors and the like included in print unit 103 to perform initial operations. When supplied with power, input display 102 performs initial operations, for example, turning on the touch panel display.

When the initial operations in controller 101, print unit 103 and input display 102 are completed, image forming apparatus 100 is switched to the normal mode in which print processing can be performed.

In the normal mode, upon receipt of reception data (packet) from host apparatus 1 such as a PC, connected to the LAN I/F 25 through network 44, sub-CPU 21 requests direct memory access (DMA) transfer from communication I/F ASIC 22.

Upon receipt of the request of DMA transfer, communication I/F ASIC 22 transfers the acquired reception data (packet) to sub-RAM 24 by DAM transfer. Here, the destination of the DMA transfer by communication I/F ASIC 22 is set to be sub-RAM 24 by control of sub-CPU 21. When completing the DMA transfer, communication I/F ASIC 22 notifies sub-CPU 21 that the reception data is stored in sub-RAM 24.

Sub-CPU 21 holds, in the unillustrated register included in sub-CPU 21, the reception data judgment program for judging the type of reception data stored in sub-RAM 24. Accordingly, upon receipt of the notification, sub-CPU 21 reads the reception data judgment program and judges whether the reception data is print data for generating image data based on which print unit 103 prints an image, or control command data for requesting status information of image formation apparatus 100 or the like. In this event, sub-CPU 21 writes, into a LAN management table, LAN management information including identification information assigned to the reception data and indicating the host apparatus, from which the reception data is transmitted, among those connected to network 44, the LAN management table stored in a predetermined memory area in sub-RAM 24. On the basis of the identification information written into the LAN management table, image forming apparatus 100 performs communication processing with the host apparatus that is the data transmission source.

When judging that the reception data is control command data, sub-CPU 21 reads the control command processing program from sub-ROM 23 and performs processing corresponding to the control command data.

When judging that the reception data is print data, on the other hand, sub-CPU 21 requests DMA transfer from image processing ASIC 12 of main unit 10 through internal bus 40, in order to transfer the print data to main CPU 11.

Upon receipt of the request of DMA transfer, image processing ASIC 12 of main unit 10 transfers the print data stored in sub-RAM 24 to main RAM 14 through internal bus 40 by DMA transfer.

When completing DMA transfer, image processing ASIC 12 notifies main CPU 11 that the print data is stored in main RAM 14.

Upon receipt of the notification, main CPU 11 converts the print data, stored in main RAM 14, to image data by using the print data processing program stored in main RAM 14, and then stores the converted image data in main RAM 14. In this event, main CPU 11 notifies sub-CPU 21 through internal bus 40 that the status of the controller 101 is "processing data."

Upon receipt of the notification indicating that the status of controller 101 is "processing data," sub-CPU 21 displays the status on the touch panel display included in input display 102 through panel I/F 43, and, at the same time, instructs print unit 103 to prepare for print processing, through CPU command I/F 42.

Upon receipt of the instruction to prepare for print processing, print unit 103 starts preparing for print processing operations such as turning on the heater of the heating roller included in an unillustrated image fixing unit.

When completing generation of image data corresponding to one page, main CPU 11 requests DMA transfer from image processing ASIC 12, in order to transfer the image data to print unit 103.

Upon receipt of the request of DMA transfer, image processing ASIC 12 transfers the image data held in main RAM 14, to print unit 103 through video I/F 41 by DMA transfer. Upon receipt of the image data, print unit 103 performs print processing based on the image data.

When print unit 103 completes the print processing, main CPU 11 measures job waiting time by using an unillustrated timer included in image forming apparatus 100 while waiting for the next job in the normal mode. At the same time, main CPU 11 reads, from main RAM 14, the program for checking whether the job waiting time has exceeded the predetermined time, and then executes the program, to monitor whether a condition for switching to the power saving mode is satisfied.

When the job waiting time exceeds the predetermined time, the condition for switching to the power saving mode is satisfied. Accordingly, main CPU 11 copies various programs 141, copied from main ROM 13 to main RAM 14 at the time of the initialization processing, and the various data, such as data stored in the unillustrated register included in main CPU 11 and management data stored in main RAM 14, to sub-RAM 24 through internal bus 40.

When completing the copying of various programs 141 and the various data, main CPU 11 writes a boot status indicating that various programs 141 and the various data are stored in sub-RAM 24, into the unillustrated register of communication I/F ASIC 22 through internal bus 40.

After writing the boot status into the unillustrated register of communication I/F ASIC 22, main CPU 11 generates a power saving mode preparation completion signal for notifying sub-CPU 21 that the preparation for switching to the power saving mode is completed, and then transmits the signal to sub-CPU 21 through internal bus 40.

Upon receipt of the power saving mode preparation completion signal, sub-CPU 21 instructs communication I/F ASIC 22 to generate a power saving mode control signal.

Upon receipt of the instruction to generate a power saving mode control signal, communication I/F ASIC 22 generates a power saving mode control signal to cut off power supply from controller power supply 30 to main unit 10, and then transmits the signal to controller power supply 30.

Upon receipt of the power saving mode control signal, controller power supply 30 cuts off power supply to main unit 10 through power supply line 50. Thereby, image forming apparatus 100 is switched to the power saving mode in which main unit 10 consumes no power. In the power saving mode, controller power supply 30 supplies power only to subunit 20 and input display unit 102 while cutting off power supply to main unit 10 for performing power-consuming image formation processing. In the power saving mode, subunit 20 receives a job from an external apparatus and thereby switches back to the normal mode, and input display unit 102 receives a print instruction. Thus, power consumption of entire image forming apparatus 100 is reduced.

When LAN I/F 25 receives reception data from host apparatus 1 in the power saving mode, sub-CPU 21 requests DMA transfer from communication I/F ASIC 22.

When completing DMA transfer of the reception data to sub-RAM 24 based on the request of DMA transfer, communication I/F ASIC 22 notifies sub-CPU 21 that the reception data is stored in sub-RAM 24.

Upon receipt of the notification, sub-CPU 21 judges, by using the reception data judgment program that the reception data stored in sub-RAM 24 is control command data. After that, sub-CPU 21 reads the control command processing program stored in the unillustrated register included in sub-CPU 21, and then performs the processing corresponding to the control command, while remaining in the power saving mode.

When judging that the reception data is print data, on the other hand, sub-CPU 21 instructs communication I/F ASIC 22 to generate a normal mode control signal, in order to switch the mode back to the normal mode.

Upon receipt of the instruction to generate a normal mode control signal, communication I/F ASIC 22 generates a normal mode control signal for resuming power supply from controller power supply 30 to main unit 10, and then transmits the signal to controller power supply 30.

Upon receipt of the normal mode control signal, controller power supply 30 resumes power supply to main unit 10 through power supply line 50. Thereby, image forming apparatus 100 is switched to the normal mode, in which power is supplied to entire main unit 10.

When power supply to main unit 10 is resumed, main CPU 11 starts an initialization operation.

In parallel with the initialization operation of main CPU 11, sub-CPU 21 copies various programs 141 and the various data copied from main RAM 14 at the time of switching to the power saving mode and stored in sub-RAM 24, to the registers of main RAM 14 and main CPU 11 through internal bus 40. In this event, sub-CPU 21 is continuously supplied with power from controller power supply 30 without interruption, and is hence capable of starting an operation for the copy processing immediately. Accordingly, main CPU 11 advances directly to a print operation by using the programs in main RAM 14 and the like.

By reading the boot status data stored in the unillustrated register of communication I/F ASIC 22 during the initialization processing, main CPU 11 checks that various program 141 and the various data copied from main RAM 14 before switching to the power saving mode are stored in sub-RAM 24. Then, CPU 11 initializes main RAM 14 as initialization processing in order to allow sub-CPU 21 to copy various programs 141 and the various data, stored in sub-RAM 24, to main RAM 14.

Since main CPU 11 reads the initialization program from main RAM 14 and then executes the program, main unit 10 is thereby switched back to the normal mode, which is the same mode as that before switching to the power saving mode.

When image forming apparatus 100 is switched back to the normal mode, image processing ASIC 12 of main unit 10 transfers the print data stored in sub-RAM 24 through internal bus 40 to main RAM 14, as the initialization operation, by DMA transfer. Thereafter, by using various programs 141 copied from sub-RAM 24 through the above procedure and stored in main RAM 14, main CPU 11 converts the print data to image data, with which the print processing can be performed, and then performs the print processing based on the image data.

Figure 2:
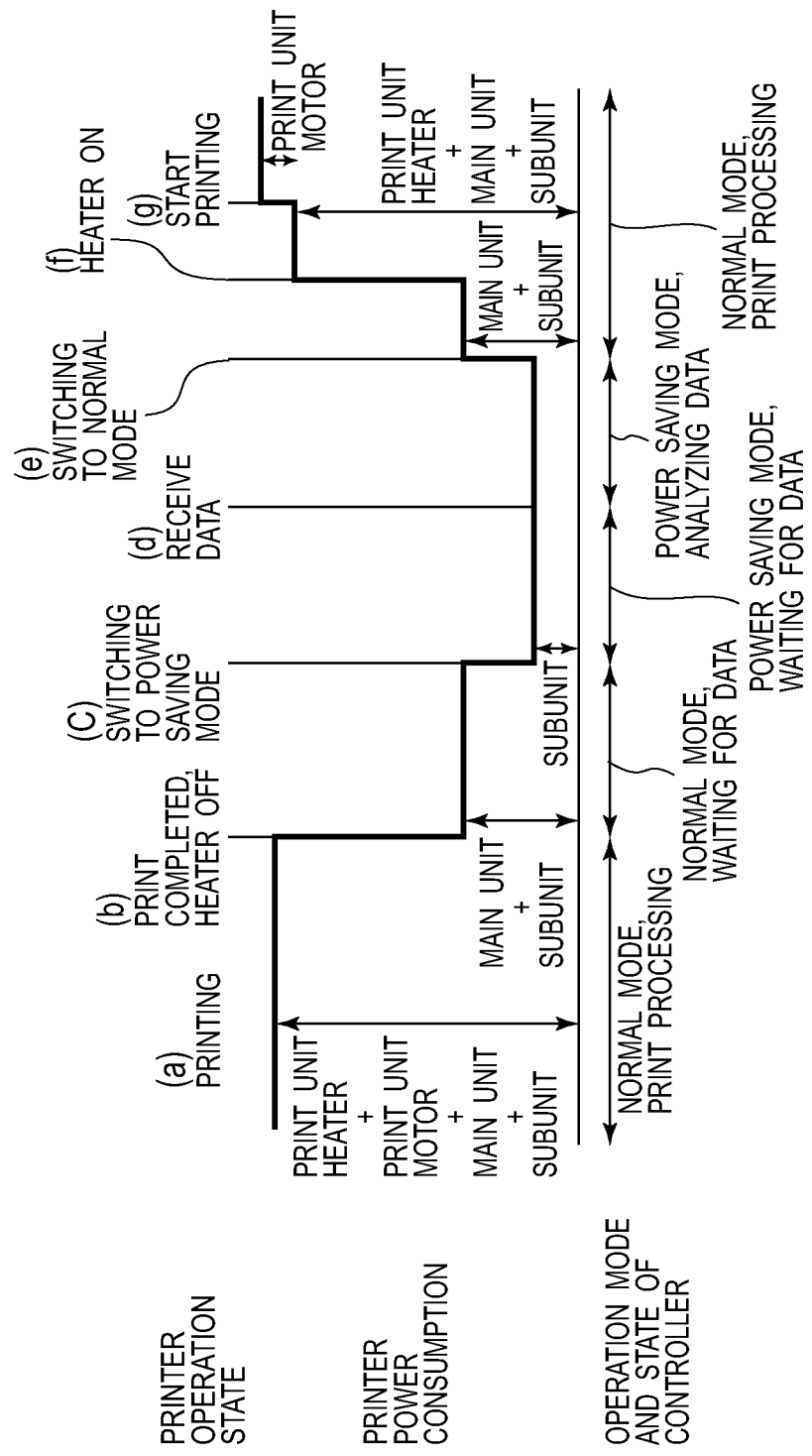
FIG. 2 is a view for illustrating power consumption of the image forming apparatus in each operation state.

FIG. 2 shows a view for illustrating power consumption of image forming apparatus 100 according to Embodiment 1 in each operation state. As shown in State (a) in FIG. 2, while image processing apparatus 100 is performing the print processing operation in the normal mode, controller power supply 30 supplies power to subunit 20 and main unit 10, and at the same time, the unillustrated power source included in image forming apparatus 100 supplies power to each unit in print unit 103 to drive the heater of the heating roller included in the image fixing unit and the motors, for example. Accordingly, power consumed by image forming apparatus 100 in print processing is the total of power consumed by subunit 20, power consumed by main unit 10 and power consumed by print unit 103 (maximum power consumption).

As shown in State (b) in FIG. 2, when image forming apparatus 100 completes the print processing and power supply to heat up the heater of the heating roller in the unillustrated image fixing unit and the like is cut off, power consumed by image forming apparatus 100 is the total of power consumed by subunit 20 and power consumed by main unit 10. At this time, image forming apparatus 100 is in the normal mode.

As shown in State (c) in FIG. 2, when the job waiting state continues longer than the predetermined time after image forming apparatus completes the print processing, various programs 141 stored in main RAM 14 and the various data stored in the register in main CPU 11 are copied to sub-RAM 24. When the copying is completed, power supply from controller power supply 30 to main unit 10 is cut off, and the mode is switched to the power saving mode. Thus, while image forming apparatus 100 is in the power saving mode, power consumed by image forming apparatus 100 is only power consumed by subunit 20.

As shown in State (d) in FIG. 2, upon receipt of reception data from host apparatus 1 while image forming apparatus 100 is in the power saving mode, sub-CPU 21 judges whether the reception data is print data or control command data. When thus receiving reception data while image forming apparatus 100 is in the power saving mode, power consumed by image forming apparatus 100 is only power consumed by subunit 20.

As shown in State (e) in FIG. 2, when sub-CPU 21 judges that the reception data received from host apparatus 1 is print data, controller power supply 30 supplies power to main unit 10, and various programs 141 and the like copied from sub-RAM 24 are simultaneously copied to main RAM 14. Accordingly, power consumed by image forming apparatus 100 at the time of switching the image forming apparatus 100 from the power saving mode to the normal mode is the total of the power consumed by subunit 20 and power consumed by main unit 10.

As shown in State (f) in FIG. 2, when image forming apparatus 100 converts the print data acquired from host apparatus 1 and then generates image data by using image processing ASIC 12, the unillustrated power source included in image forming apparatus 100 supplies power to the heater to heat up the heater of the heating roller included in the image fixing unit, in response to the instruction from main CPU 11. Accordingly, power consumed by image forming apparatus 100 at the time when image forming apparatus 100 starts preparing for print processing is the total of power consumed by subunit 20, power consumed by main unit 10 and power consumed by heating the heater of the heating roller included in the image fixing unit of print unit 103.

As shown in State (g) in FIG. 2, when the heater in print unit 103 of image forming apparatus 100 is heated up to a predetermined temperature, image forming apparatus 100 drives each unit of print unit 103, and thereby starts the print processing. Accordingly, while image forming apparatus 100 is performing the print processing in the normal mode, power is supplied to each of the motors and the like in print unit 103, and the same power as that in State (a) in FIG. 2 is consumed.

Operations in Embodiment 1

Figure 3:
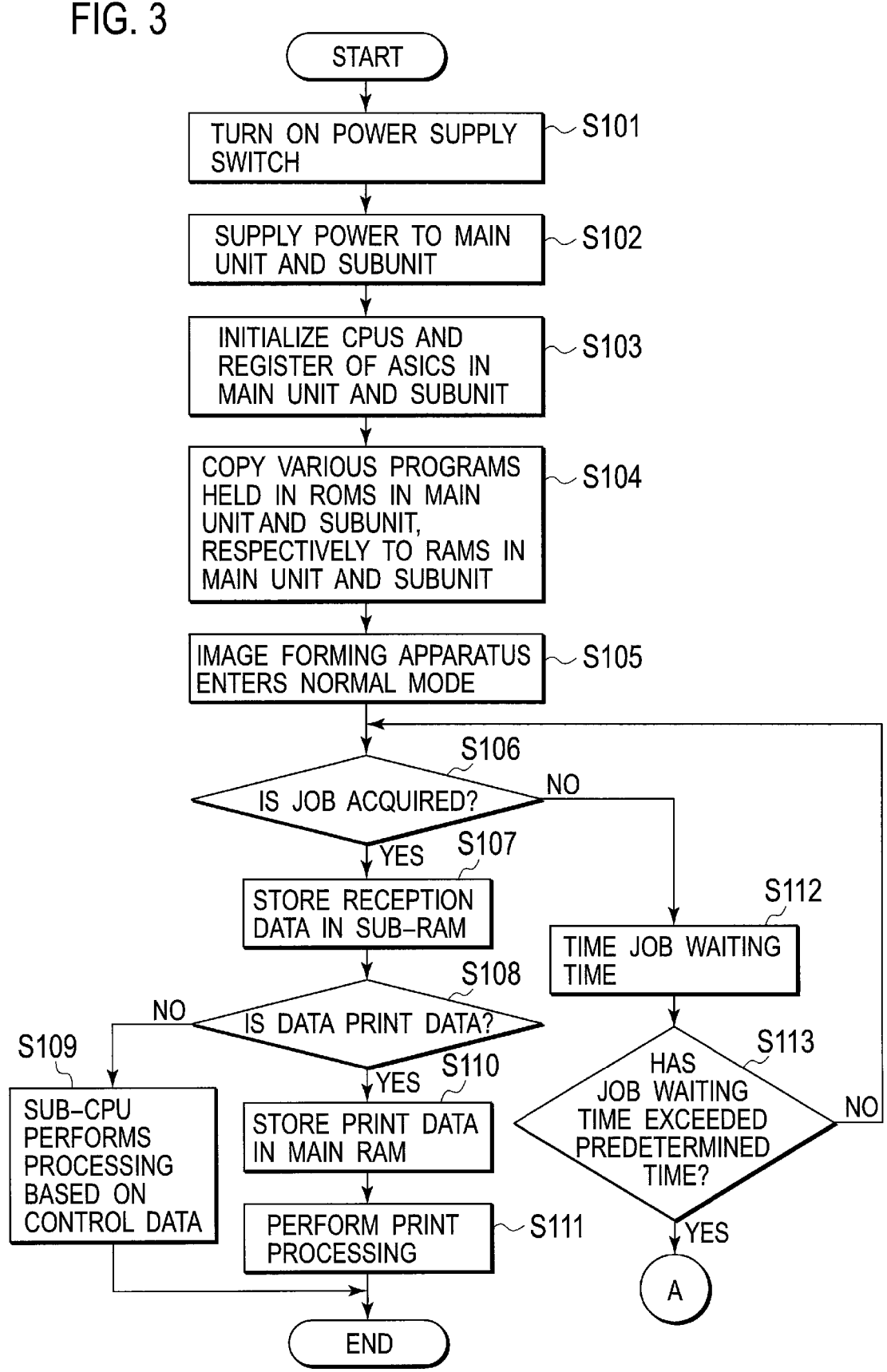
FIG. 3 is a flowchart (No. 1) of an operation of the image forming apparatus according to Embodiment 1.
Figure 4:
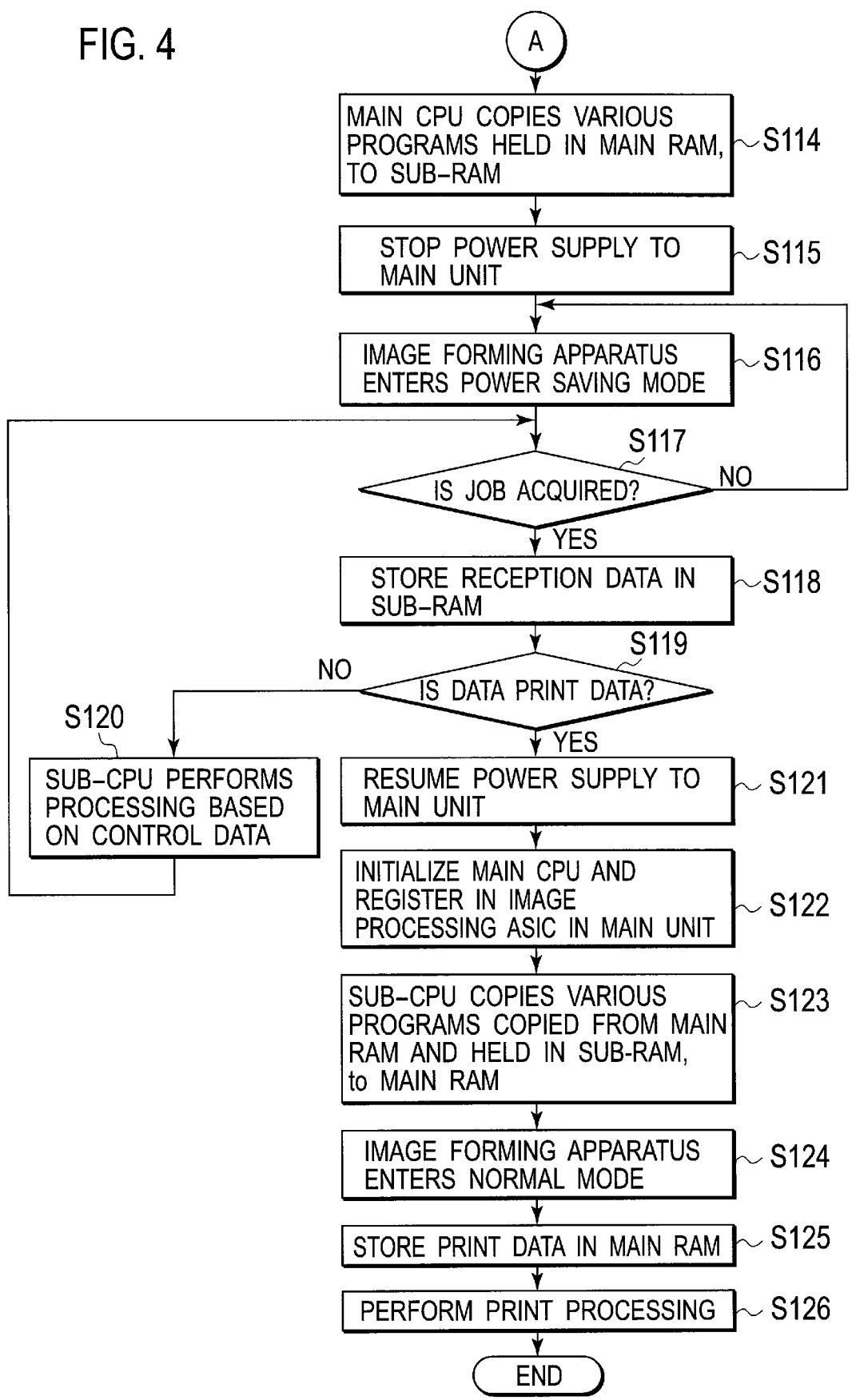
FIG. 4 is a flowchart (No. 2) of the operation of the image forming apparatus according to Embodiment 1.

Operations of image forming apparatus 100 according to Embodiment 1 are described below with reference to flowcharts in FIG. 3 and FIG. 4. When the unillustrated power supply switch included in image forming apparatus 100 is turned on (Step S101), power is supplied from the unillustrated power source included in image forming apparatus 100 to controller power supply 30. When supplied with power from the power source, controller power supply unit 30 supplies power to all the units included in controller 101 (Step S102). When the power supply switch is turned on, power is supplied from the power source to print unit 103 and input display 102.

When power supply is started, the unillustrated reset circuit included in main unit 10 generates a reset signal, and then transfers the signal to main CPU 11.

Upon receipt of the reset signal, main CPU 11 initializes (resets) the unillustrated register included in main CPU 11 and the unillustrated register included in image processing ASIC 12.

Thereafter, when power supply from controller power supply 30 to main unit 10 becomes stable and when the registers of main CPU 11 and image processing ASIC 12 are initialized and the reset signal consequently becomes void (is negated), main CPU 11 starts operating.

Meanwhile, when power supply is started, the unillustrated reset circuit included in subunit 20 generates a reset signal, and then transfers the signal to sub-CPU 21.

Upon receipt of the reset signal, sub-CPU 21 initializes (resets) the unillustrated register included in sub-CPU 21 and the unillustrated register included in communication I/F ASIC 22 (Step S103).

Thereafter, when power supply from controller power supply 30 to subunit 20 becomes stable and when the registers of main CPU 21 and communication I/F ASIC 22 are initialized and the reset signal consequently becomes void (is negated), sub-CPU 21 starts operating.

In order to execute the initialization program, which is held by main ROM 13 and is to be used for memory initialization processing, main CPU 11 generates, upon startup, an access signal to which a reset vector indicating the starting address of the initialization program is assigned, and then transfers the signal to image processing ASIC 12.

Upon receipt of the access signal, image processing ASIC 12 analyzes the address indicated by the reset vector assigned to the signal (address decoding), reads corresponding instruction data from main ROM 13 on the basis of the address, and then transfers the read instruction data to main CPU 11.

Main CPU 11 repeatedly reads instruction data and executes the initialization program, every time receiving instruction data from image processing ASIC 12. In this event, in order to copy the various programs stored in main ROM 13, to main RAM 14, main CPU 11 initializes main RAM 14 and then performs a write test on main RAM 14 to check whether main RAM 14 is operating with no problem.

When confirming that main RAM 14 is operating normally, main CPU 11 copies the various programs, such as the image data processing program, and the various data stored in main ROM 13, to main RAM 14 through image processing ASIC 12.

When starting operating, sub-CPU 21 repeatedly reads the instruction data from sub-ROM 23 storing therein the initialization program, through communication I/F ASIC 22, and then executes the initialization program. In this event, sub-CPU 21 initializes sub-RAM 24 and then performs a write test on sub-RAM 24 to check whether sub-RAM 24 is operating with no problem.

When confirming that sub-RAM 24 operates normally, sub-CPU 21 copies the various programs stored in sub-ROM 23 to sub-RAM 24 through communication I/F ASIC 22 (Step S104).

When supplied with power, print unit 103 causes motors and the like included in print unit 103 to perform initial operations. When supplied with power, input display 102 performs initial operations, for example, turning on the touch panel display.

When the initial operations in controller 101, print unit 103 and input display 102 are completed, image forming apparatus 100 is switched to the normal mode in which print processing can be performed (Step S105).

Upon receipt of reception data (packet) from a host apparatus 1 such as a PC, connected to the LAN I/F 25 through network 44, sub-CPU 21 requests DMA transfer from communication I/F ASIC 22.

Upon receipt of the request of DMA transfer, communication I/F ASIC 22 transfers the acquired reception data (packet) to sub-RAM 24 by DAM transfer (Step S107). When completing the DMA transfer, communication I/F ASIC 22 notifies sub-CPU 21 that the reception data is stored in sub-RAM 24.

Sub-CPU 21 holds, in the unillustrated register included in sub-CPU 21, the reception data judgment program for judging the type of reception data stored in sub-RAM 24. Accordingly, upon receipt of the notification, sub-CPU 21 reads the reception data judgment program and judges whether the reception data is print data for generating image data and, based on that judgement, print unit 103 prints an image, or control command data for requesting status information of image formation apparatus 100 or the like.

When judging that the reception data is control command data (Step S108), sub-CPU 21 reads the control command processing program from sub-ROM 23 and performs processing corresponding to the control command data (Step S109).

When judging that the reception data is print data, on the other hand, sub-CPU 21 requests DMA transfer from image processing ASIC 12 of main unit 10 through internal bus 40, in order to transfer the print data to main CPU 11.

Upon receipt of the request of DMA transfer, image processing ASIC 12 of main unit 10 transfers the print data stored in sub-RAM 24 to main RAM 14 through internal bus 40 by DMA transfer (Step S110).

When completing DMA transfer, image processing ASIC 12 notifies main CPU 11 that the print data is stored in main RAM 14.

Upon receipt of the notification, main CPU 11 converts the print data, stored in main RAM 14, to image data by using the print data processing program stored in main RAM 14, and then stores the converted image data in main RAM 14. In this event, main CPU 11 notifies sub-CPU 21 through internal bus 40 that the status of the controller 101 is "processing data."

Upon receipt of the notification indicating that the status of controller 101 is "processing data," sub-CPU 21 displays the status on the touch panel display included in input display 102 through panel I/F 43, and, at the same time, instructs print unit 103 to prepare for print processing, through CPU command I/F 42.

Upon receipt of the instruction to prepare for print processing, print unit 103 starts preparing for print processing operations such as turning on the heater of the heating roller included in an unillustrated image fixing unit.

When completing generation of image data corresponding to one page, main CPU 11 requests DMA transfer from image processing ASIC 12, in order to transfer the image data to print unit 103.

Upon receipt of the request of DMA transfer, image processing ASIC 12 transfers the image data held in main RAM 14, to print unit 103 through video I/F 41 by DMA transfer. Upon receipt of the image data, print unit 103 performs print processing based on the image data (Step S111).

When print unit 103 completes the print processing, main CPU 11 times job waiting time by using the unillustrated timer included in image forming apparatus 100 while waiting for the next job in the normal mode (Step S112), and at the same time reads, from main RAM 14, the program for checking whether the job waiting time has exceeded the predetermined time, and then executes the program, to monitor whether the condition for switching to the power saving mode is satisfied.

When the job waiting time exceeds the predetermined time (Step S113), the condition for switching to the power saving mode is satisfied. Accordingly, main CPU 11 copies various programs 141, copied from main ROM 13 to main RAM 14 at the time of the initialization processing, and the various data, such as data stored in the unillustrated register included in main CPU 11 and management data stored in main RAM 14, to sub-RAM 24 through internal bus 40 (Step S114).

When completing the copying of various programs 141 and the various data, main CPU 11 writes a boot status indicating that various programs 141 and the various data are stored in sub-RAM 24, into the unillustrated register of communication I/F ASIC 22 through internal bus 40.

After writing the boot status into the unillustrated register of communication I/F ASIC 22, main CPU 11 generates a power saving mode preparation completion signal for notifying sub-CPU 21 that the preparation for switching to the power saving mode is completed, and then transmits the signal to sub-CPU 21 through internal bus 40.

Upon receipt of the power saving mode preparation completion signal, sub-CPU 21 instructs communication I/F ASIC 22 to generate a power saving mode control signal.

Upon receipt of the instruction to generate a power saving mode control signal, communication I/F ASIC 22 generates a power saving mode control signal to cut off power supply from controller power supply 30 to main unit 10, and then transmits the signal to controller power supply 30.

Upon receipt of the power saving mode control signal, controller power supply 30 cuts off power supply to main unit 10 through power supply line 50 (Step S115). Thereby, image forming apparatus 100 is switched to the power saving mode (Step S116).

When LAN I/F 25 receives reception data (packet) from host apparatus 1, such as a PC, connected to network 44 while subunit 20 is in a data waiting state (Step S117), sub-CPU 21 requests DMA transfer from communication I/F ASIC 22.

When completing DMA transfer of the reception data to sub-RAM 24 based on the request of DMA transfer (Step S118), communication I/F ASIC 22 notifies sub-CPU 21 that the reception data is stored in sub-RAM 24.

Upon receipt of the notification, sub-CPU 21 judges, by using the reception data judgment program, that the reception data stored in sub-RAM 24 is control command data (Step S119). After that, sub-CPU 21 reads the control command processing program stored in the unillustrated register included in sub-CPU 21, and then performs the processing corresponding to the control command, while remaining in the power saving mode (Step S120).

When judging that the reception data is print data, on the other hand, sub-CPU 21 instructs communication I/F ASIC 22 to generate a normal mode control signal.

Upon receipt of the instruction to generate a normal mode control signal, communication I/F ASIC 22 generates a normal mode control signal for resuming power supply from controller power supply 30 to main unit 10, and then transmits the signal to controller power supply 30.

Upon receipt of the normal mode control signal, controller power supply 30 resumes power supply to main unit 10 through power supply line 50 (Step S121). Thereby, image forming apparatus 100 is switched to the normal mode, in which power is supplied to entire main unit 10.

When power supply to main unit 10 is resumed, main CPU 11 starts an initialization operation (Step S122).

In parallel with the initialization operation of main CPU 11, sub-CPU 21 copies various programs 141 and the various data copied from main RAM 14 at the time of switching to the power saving mode and stored in sub-RAM 24, to the registers of main RAM 14 and main CPU 11 through internal bus 40 (Step S123). In this event, sub-CPU 21 is continuously supplied with power from controller power supply 30 without interruption, and is hence capable of starting an operation for the copy processing immediately.

By reading the boot status data stored in the unillustrated register of communication I/F ASIC 22 during the initialization processing, main CPU 11 checks that various program 141 and the various data copied from main RAM 14 before switching to the power saving mode are stored in sub-RAM 24. Then, CPU 11 initializes main RAM 14 in order to copy various programs 141 and the various data, stored in sub-RAM 24, to main RAM 14. Here, after the initialization, a write test on a main RAM which a main CPU of a conventional image forming apparatus performs is not performed, because main CPU 11 has already performed a write test on main RAM 14 when image forming apparatus 100 was started and thereby checked that main RAM 14 would operate with no problem.

Since main CPU 11 reads the initialization program from main RAM 14 and then executes the program, main unit 10 is thereby switched back to the normal mode, which is the same mode as that before switching to the power saving mode (Step S124).

Image processing ASIC 12 of main unit 10 transfers the print data stored in sub-RAM 24 through internal bus 40 to main RAM 14 as the initialization operation (Step S125). Thereafter, by using various programs 141 copied from sub-RAM 24 and stored in main RAM 14, main CPU 11 converts the print data to image data, with which the print processing can be performed, and then performs the print processing based on the image data (Step S126).

Effects of Embodiment 1

In image forming apparatus 100 of Embodiment 1, main CPU 11 copies various programs 141 stored in main RAM 14 and various data held in the unillustrated register in main CPU 11, to sub-RAM 24, at the time of switching to the power saving mode; moreover, sub-CPU 21 of subunit 20 copies various programs 141 and various data stored in sub-RAM 24, to main RAM 14, which is simply initialized without any time-consuming write test, when power supply from controller power supply 30 to main unit 10 is started to switch the mode to the normal mode, that is, when main CPU is performing the initialization operation. With this configuration, when the mode is switched back to the normal mode, main CPU can start a print operation immediately; hence, compared with the conventional image forming apparatus, image forming apparatus 100 can reduce time required before starting the print operation.

Configuration of Embodiment 2

Image forming apparatus 100a of Embodiment 2, different from image forming apparatus 100 of Embodiment 1 configured as described above, is configured as follows. Specifically, when LAN I/F 25 receives reception data (packet) in the normal mode, communication I/F ASIC 22a sequentially transfers the reception data to main RAM 14a through image processing ASIC 12 by DMA transfer, and main CPU 11a judges whether the reception data stored in main RAM 14a is print data or not. In the power saving mode, while sequentially storing reception data in sub-RAM 24a, communication I/F ASIC 22a judges whether the reception data is print data or not. When the reception data is print data, power supply to main unit 10a is resumed, and the storing of the reception data to sub-RAM 24a is simultaneously stopped. Thereafter, sub-CPU 21a copies, to main RAM 14a, various programs 141 and various data, copied from main RAM 14a and held in sub-RAM 24a, as well as already-stored reception data, and the mode is then switched back to the normal mode. After that communication I/F ASIC 22 sequentially transfers reception data that is not stored yet, to main RAM 14a through image processing ASIC 12, by DMA transfer. Accordingly, compared with image forming apparatus 100 of Embodiment 1, image forming apparatus 100a can reduce time required before starting a print operation after switching back from the power saving mode to the normal mode.

Figure 5:
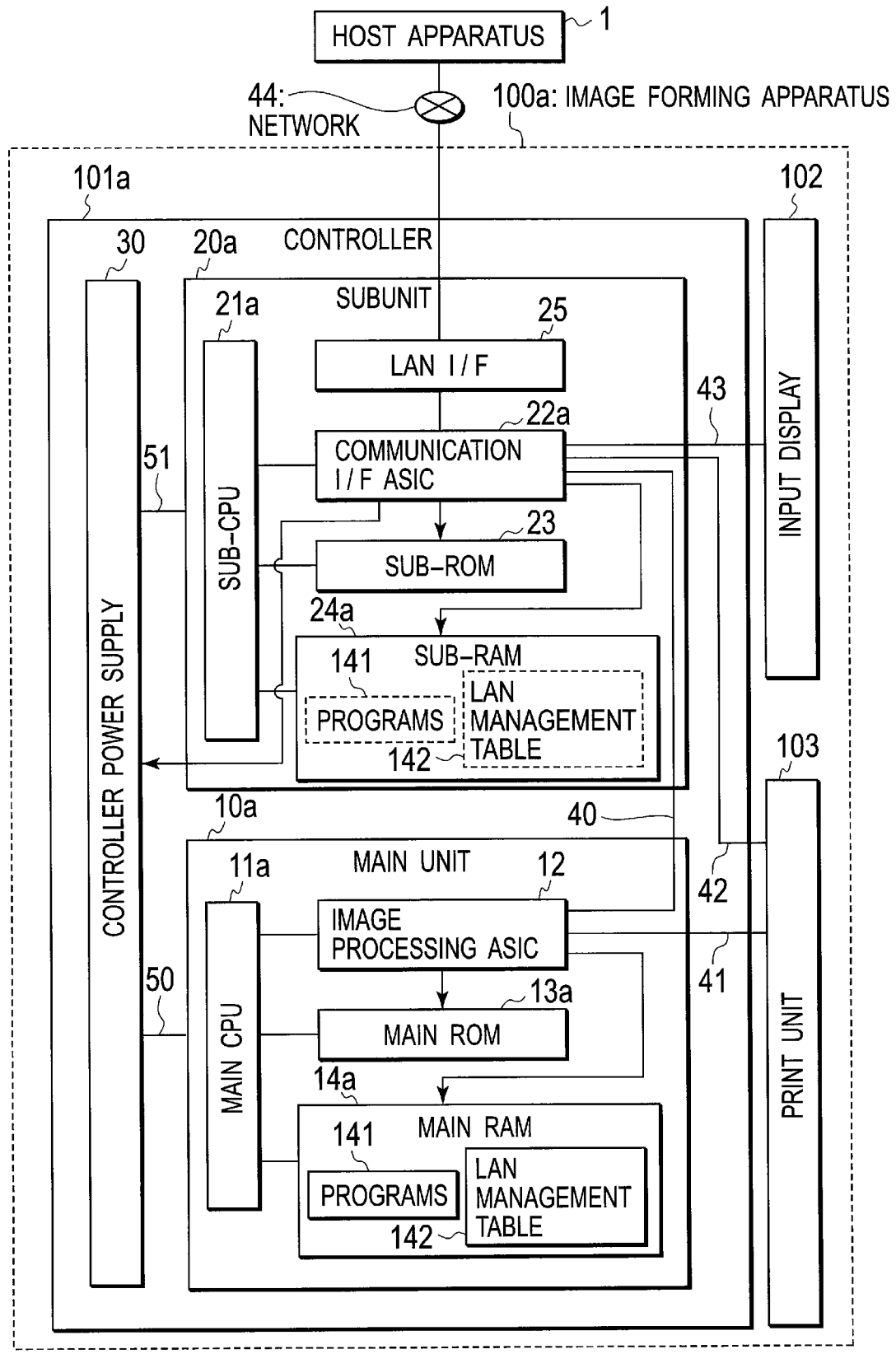
FIG. 5 is a block diagram showing a configuration of an image forming apparatus according to Embodiment 2.

As shown in FIG. 5, image forming apparatus 100a of Embodiment 2 includes controller 101a, print unit 103 and input display 102.

As shown in FIG. 5, controller 101a includes main unit 10a, subunit 20a and controller power supply 30.

As shown in FIG. 5, main unit 10a includes main CPU 11a, image processing ASIC 12, main ROM 13a and main RAM 14a.

Main ROM 13a is a nonvolatile memory for storing various programs to be executed by main CPU 11a and various data such as user set values. The various programs include, for example: the image data processing program, the initialization program, the reception data judgment program for analyzing the type of reception data acquired through communication processing; and the control command processing program to be used when the reception data is a control command.

As shown in FIG. 5, subunit 20a includes sub-CPU 21a, communication I/F ASIC 22a, sub-ROM 23 and sub-RAM 24a.

Configurations used for the operation of image forming apparatus 100a after power is supplied and until the mode is switched to the normal mode are the same as those of image forming apparatus 100 of Embodiment 1.

Next, configurations used for the operation of image forming apparatus 100a when image forming apparatus 100a acquires reception data from the host apparatus 1 in the normal mode are described.

When receiving reception data (packet) from the host apparatus 1, such as a PC, connected to LAN I/F 25 of subunit 20a through network 44, in the normal mode, LAN I/F 25 requests DMA transfer from communication I/F ASIC 22a.

Upon receipt of the request of DMA transfer, communication I/F ASIC 22a transfers the acquired reception data to main RAM 14a of main unit 10a through internal bus 40 by DMA transfer. Here, in the normal mode, the destination of the DMA transfer by communication I/F ASIC 22a is set to be main RAM 14a by control of sub-CPU 21a. When completing the DMA transfer, communication I/F ASIC 22a notifies main CPU 11a that the reception data is stored in main RAM 14a.

Main CPU 11a holds, in the unillustrated register included in main CPU 11a, the reception data judgment program for judging the type of reception data stored in main RAM 14a. Accordingly, upon receipt of the notification, main CPU 11a reads the reception data judgment program and judges whether the reception data is print data for generating image data based on which print unit 103 prints an image, or control command data for requesting status information of image formation apparatus 100a or the like. In this event, main CPU 11a writes, into LAN management table 142, LAN management information including identification information assigned to the reception data and indicating the host apparatus, from which the reception data is transmitted, among those connected to network 44, to LAN management table 142 stored in a predetermined memory area in main RAM 14a. On the basis of the identification information written into LAN management table 124, image forming apparatus 100a performs communication processing with host apparatus 1 that is the data transmission source.

When judging that the reception data is control command data, main CPU 11a reads the control command processing program from main RAM 14a and performs processing corresponding to the control command data.

When judging that the reception data is print data, on the other hand, main CPU 11a converts the print data stored in main RAM 14a into image data by using the print data processing program stored in main RAM 14a, and then stores the converted image data in main RAM 14a.

Here, the other configurations used for the operations of image forming apparatus 100a when image forming apparatus 100a receives reception data from host apparatus 1 in the normal mode are the same as those of image forming apparatus 100 of Embodiment 1.

Next, configurations used for the operation of image forming apparatus 100a when image forming apparatus 100a is switched from the normal mode to the power saving mode are described.

When the job waiting time, indicating the elapsed time after printing unit 103 completed the print processing, exceeds the predetermined time, the condition for switching to the power saving mode is satisfied. Accordingly, main CPU 11a copies various programs 141, copied from main ROM 13a to main RAM 14a at the time of the initialization processing, and the various data, such as data stored in the unillustrated register included in main CPU 11a and LAN management table 142, to sub-RAM 24a through internal bus 40.

When completing the copying of various programs 141, and various data and LAN management table 142, main CPU 11a writes a boot status indicating that various programs 141, the various data and LAN management table 142 are stored in sub-RAM 24a, into the unillustrated register of communication I/F ASIC 22a through internal bus 40.

After writing the boot status into the unillustrated register of communication I/F ASIC 22a, main CPU 11 generates a power saving mode preparation completion signal for notifying sub-CPU 21a that the preparation for switching to the power saving mode is completed, and then transmits the signal to sub-CPU 21a through internal bus 40.

Upon receipt of the power saving mode preparation completion signal, sub-CPU 21a instructs communication I/F ASIC 22a to generate a power saving mode control signal, and changes the set destination of DMA transfer by communication I/F ASIC 22a from main RAM 14a to sub-RAM 24a.

Here, the other configurations used for the operations of image forming apparatus 100a when image forming apparatus 100a is switched from the normal mode to the power saving mode are the same as those of image forming apparatus 100 of Embodiment 1.

Next, configurations used for the operation of image forming apparatus 100a when image forming apparatus 100a acquires reception data from host apparatus 1 in the power saving mode are described.

When receiving reception data (packet) from host apparatus 1, such as a PC, connected to LAN I/F 25 through network 44, in the power saving mode, LAN I/F 25 requests DMA transfer from communication I/F ASIC 22a.

When receiving the request of DMA transfer, communication I/F ASIC 22a transfers the acquired reception data to sub-RAM 24a by DMA transfer. When completing DMA transfer of the reception data, communication I/F ASIC 22a notifies sub-CPU 21a that the reception data is stored in sub-RAM 24a.

Upon receipt of the notification, sub-CPU 21a judges whether the reception data stored in sub-RAM 24a is print data or control command data, by using the reception data judgment program stored in sub-RAM 24a. In this event, sub-CPU 21a writes, into LAN management table 142, LAN management information including identification information assigned to the reception data and indicating the host apparatus 1, from which the reception data is transmitted, among those connected to network 44, LAN management table 142 copied from main RAM 14a and stored.

When judging that the reception data is control command data, sub-CPU 21a reads the control command processing program stored in the register included in sub-CPU 21a, and then performs the processing corresponding to the control command, while remaining in the power saving mode.

When judging that the reception data is print data, on the other hand, sub-CPU 21a instructs communication I/F ASIC 22a to generate a normal mode control signal, in order to switch the mode back to the normal mode.

Then, when power supply from controller power supply 30 to main unit 10a is resumed and main CPU 11a starts the initialization operation, sub-CPU 21a instructs LAN I/F 25 to stop requesting DMA transfer.

Upon receipt of the instruction to stop requesting DMA transfer, LAN I/F 25 stops requesting DMA transfer from communication I/F ASIC 22a. Thereby, DMA transfer of reception data (print data) from communication I/F ASIC 22a to sub-RAM 24a is stopped. Here, in LAN management table 142 stored in sub-RAM 24a, LAN management information based on the print data (packets) already stored in sub-RAM 24a is written.

When communication I/F ASIC 22a stops DMA transfer to sub-RAM 24a, sub-CPU 21a copies various programs 141 and the various data such as LAN management table 142, copied from main RAM 14a at the time of switching to the power saving mode in parallel with the initialization operation of main CPU 11a, and the "print data (packets)" already stored in sub-RAM 24a, to main RAM 14a and the register in main CPU 11a through internal bus 40.

In parallel with the copy operation, sub-CPU 21a changes the set destination of DMA transfer by communication I/F ASIC 22a from sub-RAM 24a to main RAM 14a. When completing the changing of set destination of DMA transfer, sub-CPU 21a instructs LAN I/F 25 to resume requesting DMA transfer.

Upon receipt of the instruction to resume requesting DMA transfer, LAN I/F 25 resumes requesting DMA transfer from communication I/F ASIC 22a.

When the copying is completed, main CPU 11a reads various programs 141 from main RAM 14a and then executes the programs. Thereby, main unit 10a is switched back to the normal mode, which is the same mode as that before switching to the power saving mode.

When image forming apparatus 100a is switched back to the normal mode, communication I/F ASIC 22a transfers print data (packet), reception of which is resumed, to main RAM 14a by DMA transfer on the basis of the request of DMA transfer from LAN I/F 25.

Then, main CPU 11a writes, into LAN management table 142, LAN management information based on the print data (packet), reception of which is resumed, and which is stored in main RAM 14a. Thus, in LAN management table 142, the LAN management information associating the print data (packet) which is copied from sub-RAM 24a before reception stop and the print data (packet) which is stored after reception resumption is written.

Here, the other configurations used for the operation of image forming apparatus 100a when image forming apparatus 100a acquires reception data from host apparatus 1 in the power saving mode are the same as those of image forming apparatus 100 of Embodiment 1.

Operations in Embodiment 2

Figure 6:
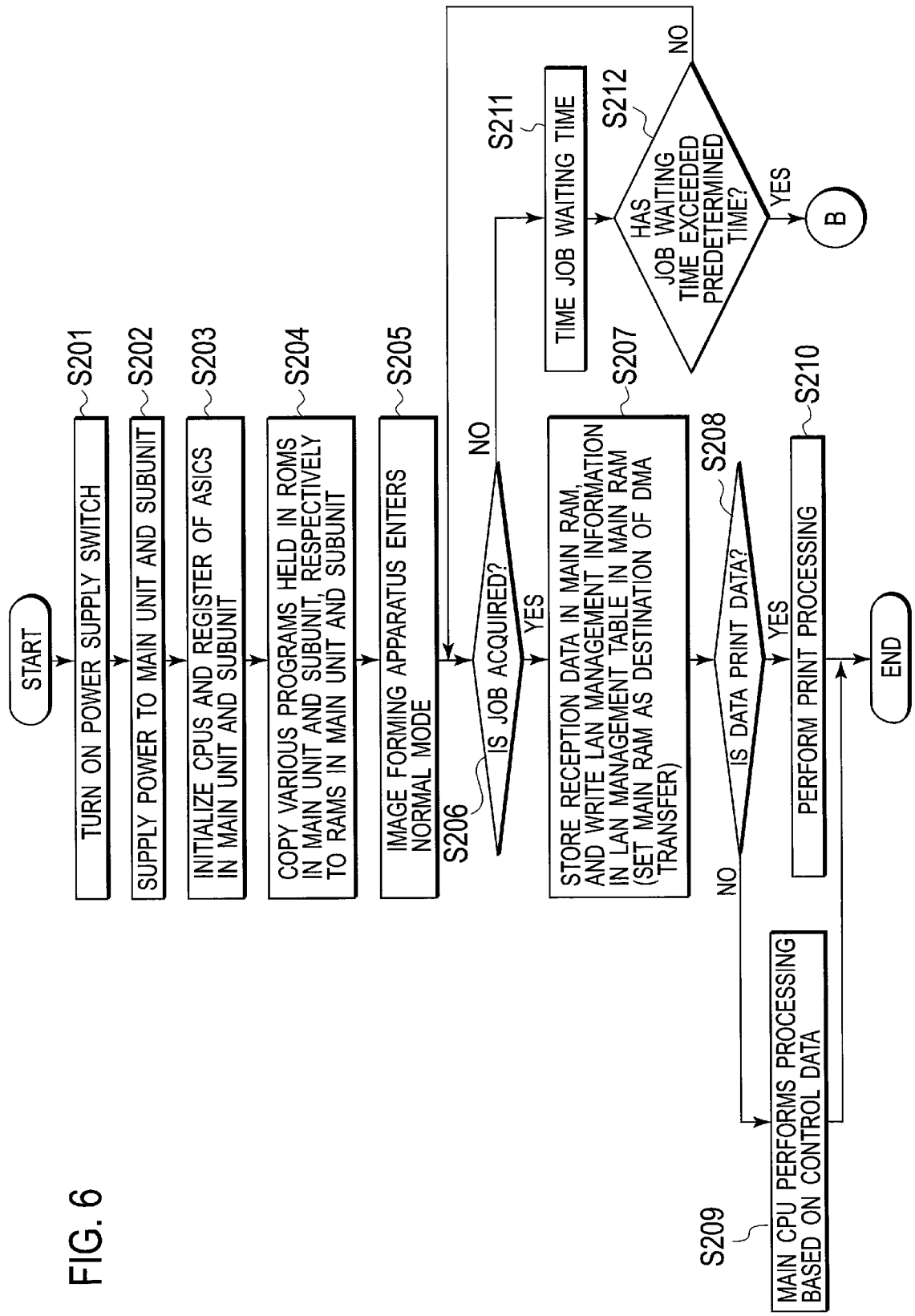
FIG. 6 is a flowchart (No. 1) of an operation of the image forming apparatus according to Embodiment 2.
Figure 7:
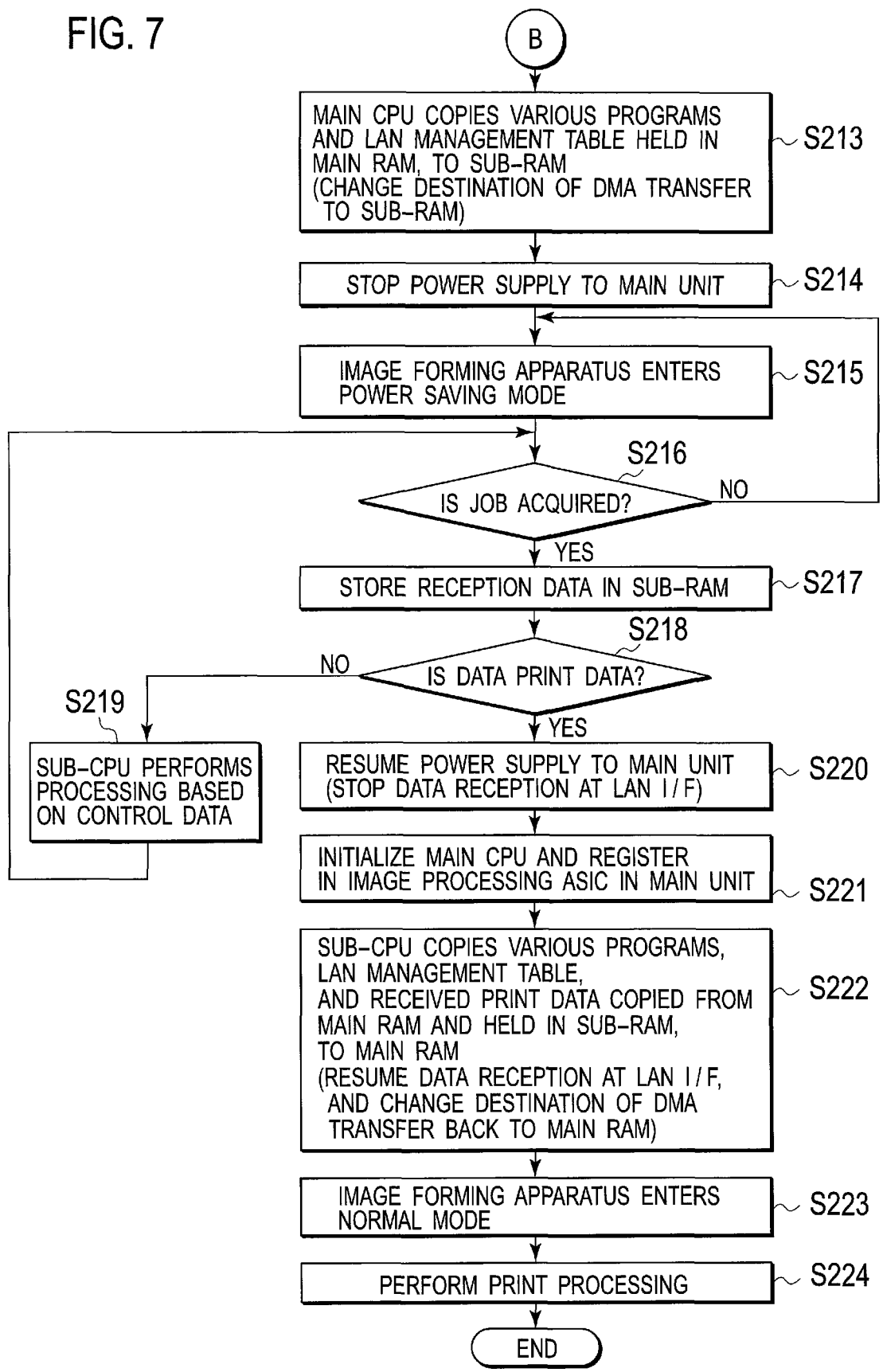
FIG. 7 is a flowchart (No. 2) of the operation of the image forming apparatus according to Embodiment 2.

Operations of image forming apparatus 100a according to Embodiment 2 are described below with reference to flowcharts in FIG. 6 and FIG. 7.

The operations of image forming apparatus 100a of Embodiment 2 in Steps S201 to S205 are the same as those of image forming apparatus 100 of Embodiment 1 in Steps S101 to S105.

Upon receipt of reception data (packet) from a host apparatus 1 such as a PC, connected to the LAN I/F 25 through network 44 (Step S206), LAN interface 25 of subunit 20a requests DMA transfer from communication I/F ASIC 22a.

Upon receipt of the request of DMA transfer, communication I/F ASIC 22a transfers the acquired reception data to main RAM 14a of main unit 10a through internal bus 40 by DAM transfer (Step S207). Here, the destination of DMA transfer by communication I/F ASIC 22a in the normal mode is set to main RAM 14a by control of sub-CPU 21a. When completing the DMA transfer, communication I/F ASIC 22a notifies main CPU 11a that the reception data is stored in main RAM 14a.

Main CPU 11a holds, in the unillustrated register included in main CPU 11a, the reception data judgment program for judging the type of reception data stored in main RAM 14a. Accordingly, upon receipt of the notification, main CPU 11a reads the reception data judgment program and judges whether the reception data is print data for generating image data based on which print unit 103 prints an image, or control command data for requesting status information of image formation apparatus 100a or the like. In this event, main CPU 11a writes, into LAN management table 142, LAN management information including identification information assigned to the reception data and indicating the host apparatus 1, from which the reception data is transmitted, among those connected to network 44, LAN management table 142 stored in the predetermined memory area in main RAM 14a.

When judging that the reception data is control command data (Step S208), main CPU 11a reads the control command processing program from main RAM 14a and performs processing corresponding to the control command data (Step S209).

When judging that the reception data is print data, on the other hand, main CPU 11a converts the print data stored in main RAM 14a to image data by using the print data processing program stored in main RAM 14a, and stores the converted image data in main RAM 14a. Thereafter, in print unit 103, print processing based on the image data is performed (Step S210).

The operation of image forming apparatus 100a of Embodiment 2 in Step S211 is the same as that of image forming apparatus 100 of Embodiment 1 in Step S112.

When the job waiting time, indicating the elapsed time after print unit 103 completed the print processing, exceeds the predetermined time (Step S212), the condition for switching to the power saving mode is satisfied. Accordingly, main CPU 11a copies various programs 141, copied from main ROM 13a to main RAM 14a at the time of the initialization processing, and the various data, such as data stored in the unillustrated register included in main CPU 11a and LAN management table 142 stored in main RAM 14a, to sub-RAM 24a through internal bus 40 (Step S213).

When completing the copying of various programs 141, the various data and LAN management table 142, main CPU 11a writes a boot status indicating that various programs 141, the various data and LAN management table 142 are stored in sub-RAM 24a, into the unillustrated register of communication I/F ASIC 22a through internal bus 40.

After writing the boot status into the unillustrated register of communication I/F ASIC 22a, main CPU 11a generates a power saving mode preparation completion signal for notifying sub-CPU 21a that the preparation for switching to the power saving mode is completed, and then transmits the signal to sub-CPU 21a through internal bus 40.

Upon receipt of the power saving mode preparation completion signal, sub-CPU 21a instructs communication I/F ASIC 22a to generate a power saving mode control signal, and at the same time, changes the destination of DMA transfer by communication I/F ASIC 22a from main RAM 14a to sub-RAM 24a.

The operations of image forming apparatus 100a of Embodiment 2 in Steps S214 to S215 are the same as those of image forming apparatus 100 of Embodiment 1 in Step S115 to S116.

When receiving reception data (packet) from host apparatus 1, such as a PC, connected to network 44 in the power saving mode (Step S216), LAN I/F 25 requests DMA transfer from communication I/F ASIC 22a.

Upon receipt of the request of DMA transfer, communication I/F ASIC 22a transfers the acquired reception data to sub-RAM 24a by DMA transfer (Step S217). Thereafter, when completing DMA transfer, communication I/F ASIC 22a notifies sub-CPU 21a that the reception data is stored in sub-RAM 24a.

Upon receipt of the notification, sub-CPU 21a judges whether the reception data stored in sub-RAM 24a is print data or control command data, by using the reception data judgment program stored in sub-RAM 24a. In this event, sub-CPU 21a writes, into LAN management table 142, LAN management information including identification information assigned to the reception data and indicating the host apparatus 1, from which the reception data is transmitted, among those connected to network 44, LAN management table 142 copied from main RAM 14a and stored.

When judging that the reception data is control command data (Step S218), sub-CPU 21a reads the control command processing program stored in the register included in sub-CPU 21a, and executes the processing corresponding to the control command, while remaining in the power saving mode (Step S219)

When judging that the reception data is print data on the other hand, sub-CPU 21a instructs communication I/F ASIC 22a to generate a normal mode control signal, in order to switch the mode back to the normal mode.

The operation of information forming apparatus 100a of Embodiment 2 in Steps S220 to S221 are the same as those of information forming apparatus 100 of Embodiment 1 in Steps S121 to S122.

Then, when power supply from controller power supply 30 to main unit 10a is resumed and main CPU 11a starts the initialization operation, sub-CPU 21a instructs LAN I/F 25 to stop requesting DMA transfer.

Upon receipt of the instruction to stop requesting DMA transfer, LAN I/F 25 stops requesting DMA transfer from communication I/F ASIC 22a. Thereby, DMA transfer of reception data (print data) from communication I/F ASIC 22a to sub-RAM 24a is stopped. At this time, in LAN management table 142 stored in sub-RAM 24a, LAN management information based on the print data (packets) already stored in sub-RAM 24a is written.

When communication I/F ASIC 22a stops DMA transfer to sub-RAM 24a, sub-CPU 21a copies various programs 141 and the various data such as LAN management table 142, copied from main RAM 14a at the time of switching to the power saving mode in parallel with the initialization operation of main CPU 11a, and also copies the "print data (packets)" already stored in sub-RAM 24a, to main RAM 14a and the register in main CPU 11a through internal bus 40 (Step S222).

In parallel with the copy operation, sub-CPU 21a changes the set destination of DMA transfer by communication I/F ASIC 22a from sub-RAM 24a to main RAM 14a. When completing the changing of set destination of DMA transfer, sub-CPU 21a instructs LAN I/F 25 to resume requesting DMA transfer.

Upon receipt of the instruction to resume requesting DMA transfer, LAN I/F 25 resumes requesting DMA transfer from communication I/F ASIC 22a.

When the copying is completed, main CPU 11a reads various programs 141 from main RAM 14a and then executes the programs. Thereby, main unit 10a is switched back to the normal mode, which is the same mode as that before switching to the power saving mode (Step S223).

When image forming apparatus 100a is switched back to the normal mode, communication I/F ASIC 22a transfers print data (packet), reception of which is resumed, to main RAM 14a by DMA transfer on the basis of the request of DMA transfer from LAN I/F 25.

Then, main CPU 11a writes, into LAN management table 142, LAN management information based on the print data (packet), reception of which is resumed, and which is stored in main RAM 14a. Thus, in LAN management table 142, the LAN management information associating the print data (packet) which is copied from sub-RAM 24a before reception stop and the print data (packet) which is stored after reception resumption is written.

The operation of image forming apparatus 100a of Embodiment 2 in Step S224 is the same as that of image forming apparatus 100 of Embodiment 1 in step S126.

Effects of Embodiment 2

In image forming apparatus 100a of Embodiment 2, print data held in sub-RAM 24a is copied to main RAM 14a together with various programs 141 and the various data in a single process at the time of shifting from the power saving mode to the normal mode. Accordingly, compared with image forming apparatus 100 of Embodiment 1, image forming apparatus 100a can reduce time required before starting the print operation.

Moreover, in image forming apparatus 100a, the print data received in the normal mode is stored directly in main RAM 14a through image processing ASIC 12 by DMA transfer by communication I/F ASIC 22a, instead of being stored in sub-RAM 24a and then in main RAM 14a as in image forming apparatus 100 of Embodiment 1. Accordingly, compared with image forming apparatus 100 of Embodiment 1, image forming apparatus 100a can reduce time required before starting the print operation based on the print data received in the normal mode.

In each of the above-described embodiments, the case in which the image forming apparatus of the embodiment is a printer is described. However, the invention is not limited to a printer, and is also applicable to a copier or a multifunction peripheral (MFP).

As described above, the image forming apparatus according to each of the embodiments can reduce time required before starting the print operation after the switching from the power saving mode back to the normal mode. Accordingly, the image forming apparatus can reduce time required for the CPU for which power supply from the power supply has just resumed, at the time of switching from the power saving mode to the normal mode. Furthermore, the image forming apparatus according to each of the embodiments can reduce time required for the CPU to complete the copying of the various programs and the various data from the flash memory to the RAM, to be switched back to the normal mode and to then start the print operation, so that the usability of the image forming apparatus is improved.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

What is claimed is:

1. An image forming apparatus comprising:
   a reception controller configured to receive print data;
   a volatile memory configured to store program information for performing image formation;
   an image forming unit configured to form an image on the basis of the print data;
   an image formation controller configured to receive the program information from the volatile memory and to control the image forming unit on the basis of the program information;
   a power supply configured to stop supply of power to the volatile memory, the image forming controller and the image formation unit while continuing to supply power to the reception controller, when the condition for switching from a normal mode to a power saving mode is satisfied;
   an auxiliary volatile memory supplied with power by the power supply; and
   an information saving path configured to save the program information from the volatile memory to the auxiliary volatile memory before the switching to the power saving mode, wherein
   when the condition for switching from the power saving mode to the normal mode is satisfied, the reception controller instructs the power supply to supply power to the image formation controller, the volatile memory and the image forming unit, and transfers the program information in the auxiliary volatile memory to the volatile memory, wherein the auxiliary volatile memory is provided within the reception controller.

2. The apparatus of claim 1, wherein the volatile memory is provided within the image formation controller.

3. The apparatus of claim 2, wherein the image formation controller comprises a processor configured to save the program information by using the information saving path.

4. The apparatus of claim 3, wherein the image formation controller comprises a nonvolatile memory configured to store a program executed by the processor.

5. The apparatus of claim 4, wherein the reception controller comprises a sub-processor configured to judge, when receiving data from an external apparatus in the power saving mode, whether the data is print data or not, and to control the switching from the power saving mode to the normal mode when the data is print data.

6. The apparatus of claim 5, wherein
   the reception controller comprises a sub-nonvolatile memory configured to store a control command processing program, and
   when judging that the received data is control command data requesting status information of the image forming apparatus, the sub-processor reads the control command processing program stored in the sub-nonvolatile memory and then performs processing corresponding to the control command data.

7. The apparatus of claim 6, further comprising an input display connected to the reception controller and supplied with power from a power source different from the power supply.

8. The apparatus of claim 1, wherein the reception controller comprises a sub-processor configured to judge, when receiving data from an external apparatus in the power saving mode, whether the data is print data or not, and to control the switching from the power saving mode to the normal mode when the data is print data.

9. The apparatus of claim 8, wherein
the reception controller comprises a sub-nonvolatile memory configured to store a control command processing program, and
when judging that the received data is control command data requesting status information of the image forming apparatus, the sub-processor reads the control command processing program stored in the sub-nonvolatile memory and then performs processing corresponding to the control command data.

10. The apparatus of claim 1, further comprising an input display connected to the reception controller, configured to be supplied power from a second power supply.

11. An image forming apparatus comprising:
a reception controller configured to receive print data;
a volatile memory configured to store program information for performing image formation;
an image forming unit configured to form an image on the basis of the print data;
an image formation controller configured to receive the program information from the volatile memory and to control the image forming unit on the basis of the program information;
a power supply configured to stop supply of power to the volatile memory, the image forming controller and the image formation unit while continuing to supply power to the reception controller, when the condition for switching from a normal mode to a power saving mode is satisfied;
an auxiliary volatile memory supplied with power by the power supply; and
an information saving path configured to save the program information from the volatile memory to the auxiliary volatile memory before the switching to the power saving mode, wherein
when the condition for the switching from the power saving mode to the normal mode is satisfied, the reception controller instructs the power supply to supply power to the image formation controller, the volatile memory and the image forming unit, and transfers the program information in the auxiliary volatile memory to the volatile memory, wherein
when receiving data from an external apparatus in the normal mode, the reception controller stores the data in the volatile memory and notifies the image formation controller of the storing,
upon receipt of the notification, the image formation controller judges whether job data stored in the volatile memory is the print data or not, and stores management information of the data in a management table in the volatile memory,
the information saving path saves the program information as well as the management table from the volatile memory to the auxiliary volatile memory, before the normal mode is switched to the power saving mode, and
when receiving data from an external apparatus in the power saving mode, the reception controller judges whether the data is the print data, controls the switching from the power saving mode to the normal mode if the data is the print data, instructs the power supply to supply power to the image formation controller, the volatile memory and the image forming unit, and thereby transfers the program information and the management information from the management table in the auxiliary volatile memory to the volatile memory.

12. The apparatus of claim 11, wherein the management table includes identification information of at least one apparatus connected to the image forming apparatus.

* * * * *